United States Patent
Benthien

(10) Patent No.: US 7,462,006 B2
(45) Date of Patent: Dec. 9, 2008

(54) FASTENING ARRANGEMENT FOR LASHING BRACKETS IN THE FLOOR OF A CARGO HOLD OF AN AIRCRAFT

(75) Inventor: Herrmann Benthien, Sottrum (DE)

(73) Assignee: AIRBUS Deutschland GmbH, Hamburg (DE)

( * ) Notice: Subject to any disclaimer, the term of this patent is extended or adjusted under 35 U.S.C. 154(b) by 0 days.

(21) Appl. No.: 12/009,150

(22) Filed: Jan. 16, 2008

(65) Prior Publication Data

US 2008/0175685 A1 Jul. 24, 2008

Related U.S. Application Data

(60) Provisional application No. 60/881,640, filed on Jan. 22, 2007.

(30) Foreign Application Priority Data

Mar. 9, 2007 (DE) ................... 10 2007 011 611

(51) Int. Cl.
*B60P 7/08* (2006.01)

(52) U.S. Cl. .................. 410/107; 410/104; 410/106; 410/111

(58) Field of Classification Search ......... 410/104–107, 410/109–112, 116; 24/115 K, 265 CD; 244/118.1, 244/137.1
See application file for complete search history.

(56) References Cited

U.S. PATENT DOCUMENTS 5,180,263 A * 1/1993 Flowers, Jr. ................. 410/106

\* cited by examiner

*Primary Examiner*—Stephen Gordon
(74) *Attorney, Agent, or Firm*—Jenkins, Wilson, Taylor & Hunt, P.A.

(57) ABSTRACT

Disclosed is a fastening arrangement for lashing brackets in the floor of a cargo hold of an aircraft. In this case, a plurality of channels that extend in the longitudinal direction of the aircraft, together with transverse profiles or frames lying under them, form a grid-like floor framework. The frames and the channels extend in each case preferably such that they are uniformly spaced apart and parallel to one another. A lashing bracket is pivotably accommodated in the at least one channel. The connection between the lashing bracket, the channel and the frame can be performed with two half-barrel nuts, which are arranged in the region of a thickening of the web of the frame and into which two screw bolts are screwed.

9 Claims, 1 Drawing Sheet

FASTENING ARRANGEMENT FOR LASHING BRACKETS IN THE FLOOR OF A CARGO HOLD OF AN AIRCRAFT

CROSS-REFERENCE TO RELATED APPLICATIONS

This application claims the benefit of U.S. Provisional Application No. 60/881,640, filed Jan. 22, 2007 and German patent application No. 10 2007 011 611.1, filed Mar. 9, 2007, the entire disclosures of which are herein incorporated by reference.

FIELD OF THE INVENTION

The invention relates to a fastening arrangement for lashing brackets in the floor of a cargo hold of an aircraft to create lashing points, wherein the at least one lashing° bracket is pivotably accommodated in at least one channel that extends parallel to a longitudinal axis of the aircraft, and the at least one channel is arranged on a plurality of transverse profiles that extend transversely in relation to the longitudinal axis and with preference are uniformly spaced apart from one another.

BACKGROUND OF THE INVENTION

The floor of an aircraft, and in particular the floor of the cargo hold of an aircraft, is formed by a plurality of uniformly spaced-apart longitudinal profiles which extend parallel to the longitudinal axis (x axis) of the aircraft. Underneath the longitudinal profiles there extend transverse beams, which in the case of some types of aircraft, in particular freight aircraft, at the same time form the frames (known as integral frames). The transverse beams extend with preference such that they are uniformly spaced apart underneath the longitudinal profiles, in each case transversely (y axis) in relation to the longitudinal axis of the aircraft. The longitudinal profiles may be formed, at least to some extent, as channels (known as "tie-down channels"), which serve for accommodating lashing points. Rolling loads, for example, are secured on the floor of the cargo hold by means of the lashing points to prevent them from changing their position. The longitudinal profiles resting on the transverse beams form together with further elements the floor framework in the form of a grid. Placed between the longitudinal profiles are floor panels, to create a floor surface that is substantially planar and can be walked on.

The transverse beams optimally transfer transverse loads that act parallel to the y axis, that is to say transversely in relation to the direction of flying. Furthermore, torques about the z axis (known as torque $M_z$) can be absorbed by the transverse beams. The forces occurring parallel to the x axis and the z axis (known as forces $F_x$ and $F_z$) and the torques about the x axis and the y axis (known as torques $M_x$ and $M_y$) require frames that can sufficiently withstand mechanical loads. The longitudinal beams or the channels are in turn advantageously subjected to the loading of the forces $F_x$ and the torques $M_y$.

Conventionally, lashing points are usually connected by four screws each to the upper frame flanges of the frames. Therefore, the mechanical loads mentioned are introduced by way of the indirect path in the form of the frame, resulting in additional statically relevant offset moments, which have to be absorbed and which lead to increases in weight on account of the more stable design of the frames that is required for this purpose.

SUMMARY OF THE INVENTION

One of the objects of the invention is to avoid the disadvantages described above of the known connections of lashing points to the channels by separating the load components in a way that is optimal in terms of weight.

Accordingly, a fastening arrangement for lashing brackets in the floor of a cargo hold of an aircraft to create lashing points is provided, wherein the at least one lashing bracket is pivotably accommodated in at least one channel that extends parallel to a longitudinal axis of the aircraft, the at least one channel is arranged on a plurality of transverse profiles that extend transversely in relation to the longitudinal axis, and the at least one channel and the at least one lashing bracket are fastened on the at least one transverse profile by at least two barrel nuts.

The fact that the at least one channel and the at least one lashing bracket are fastened on the at least one transverse profile by at least two barrel nuts means that the two forces $F_z$, $F_y$ and the torque $M_x$ are introduced directly into the framework by way of two barrel nuts in the crossing region between the channel and the transverse profile. The force $F_x$ can no longer induce a parasitic torque, since the loads are introduced directly in the region of the neutral fibre of the channel.

The fact that now only two screw connections are used instead of the four screw connections previously used additionally produces a considerable reduction in the number of screw connections required in comparison with the previously known solutions, and consequently a further reduction in weight.

According to one embodiment of the invention, the connection concept can be used in the case of a transverse profile formed as a transverse beam and/or as a frame.

The barrel nut connection of the lashing points may be used in the case of the so-called integral frames, which are milled out in one piece from solid material. In the case of the generally semicircular integral frames, the transverse beam is formed in one piece with the frame along with further supporting struts of the transverse beam. As an alternative or in addition, the connection concept can also be used in the case of conventional frames, into which a separate transverse beam is riveted along with a supporting truss for example.

According to one embodiment, the frame has, at least in certain portions in the region of a web, a thickening in which at least two transverse holes are made to receive the barrel nuts.

As a result, the forces and moments emanating from the lashing point are substantially introduced only in the region of the neutral fibre of the transverse profile, whereby a design which is lighter, and consequently reduced in weight, becomes possible.

In accordance with a further embodiment, instead of cylindrical barrel nuts, so-called half-barrel nuts with a half-cylindrical geometry are provided. This produces a further halving of the weight in relation to the standard barrel nuts, along with a nevertheless adequate mechanical load-bearing capacity.

The half-barrel nuts have in a known way a threaded hole, into which a threaded bolt can be screwed. In cases where there are increased strength requirements, barrel nuts may be used at least to some extent instead of the half-barrel nuts.

BRIEF DESCRIPTION OF THE DRAWINGS

In the drawings, the same structural elements have in each case the same reference numerals.

DETAILED DESCRIPTION OF THE INVENTION

Figure 1:
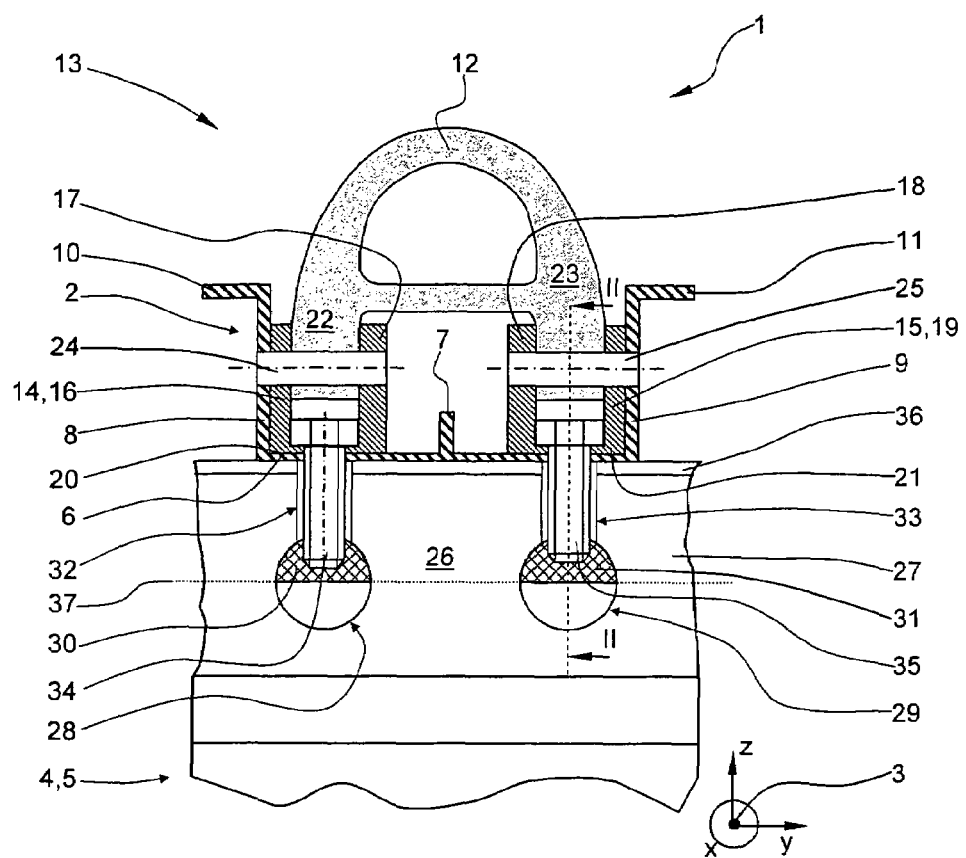
FIG. 1 shows a highly schematized cross-sectional representation of the fastening arrangement.

FIG. 1 shows a schematic representation of the fastening arrangement in the form of a cross section through a channel with a lashing bracket fastened in it and a transverse profile extending underneath the channel, which represent part of a floor grating of the floor of a cargo hold of an aircraft that is in the form of a grid and is not represented any more specifically. The transverse profile resting on the channel forms a crossing region within the floor grating.

A fastening arrangement 1 comprises, inter alia, a channel 2, which extends parallel to an x axis of a system of coordinates 3. The x axis extends parallel to the longitudinal axis of the aircraft. Arranged underneath the channel 2 in this exemplary embodiment is a frame 4, with a transverse profile 5, which extends parallel to the y axis of the system of coordinates 3, being an integral part of the (integral) frame 4. Hereafter, only the term "frame" is used for the frame 4 that also comprises the transverse profile 5. Alternatively, the frames and the transverse beams could also be functionally separate components. The beam 4 is part of a fuselage cell of an aircraft that is not represented.

To form a floor framework, which is not represented, there extend in the fuselage cell of the aircraft a plurality of channels that are respectively uniformly spaced apart parallel to the channel 2, that is to say parallel to the x axis in the direction of flying.

Underneath the channel 4 and respectively parallel to the y axis of the system of coordinates (transversely to the longitudinal axis or the direction of flying) there also extend a plurality of frames or transverse beams that are, for example, likewise uniformly spaced apart from one another and, together with the channels or the longitudinal profiles, represent the actual floor framework.

The channel 2 with an approximately U-shaped cross-sectional geometry comprises a base 6, a reinforcing web 7 and two side walls 8, 9 perpendicularly adjoining the base 6. Both upper ends of the side walls 8, 9 are respectively adjoined by a horizontally outward pointing flange 10, 11 of a small width. The fastening of a lashing bracket 12 to create a lashing point 13 is performed with two fork-shaped fork holders 14, 15, which are fastened in the channel 2. The fork holders 14, 15 have in each case two legs 16, 17 and 18, 19, which are respectively arranged at a distance from one another on a base plate 20, 21. Pivotably accommodated between the legs 16, 17 and 18, 19 there is in each case a lashing bracket leg 22, 23, in each case on a bolt 24, 25 in holes in the fork holders 14, 15 that are not provided with a reference numeral. Consequently, when it is not in use, the lashing bracket 12 can be swung into the channel 2 (rest position), so that a substantially planar cargo floor surface is obtained. In the representation of FIG. 1, the lashing bracket 12 is in the normal position for use. To suppress rattling noises and to secure the position of the lashing bracket 12 in the respective position, further springing, latching, securing or clamping elements that are not represented may be required. Furthermore, the half-barrel nuts 30, 31 may be secured with securing means that are not represented any more specifically to prevent uncontrolled turning within the transverse holes 28, 29 and/or to prevent them from falling out laterally from the vertical holes 32, 33.

According to the invention, two transverse holes 28, 29 for receiving two half-barrel nuts 30, 31 have been made in a web 26 of the frame 4, preferably in the region of a thickening 27. Alternatively, barrel nuts, which have a shape corresponding to a full cylinder, may also be introduced into the transverse holes 28, 29. This allows greater loads to be introduced into the frame 4, while at the same time accepting an increased overall weight of the fastening arrangement 1.

In addition, the frame 4 has two vertical holes 32, 33, which are formed with a slight oversize to compensate for tolerance. In both fork holders 14, 15, two horizontal holes have respectively being introduced, lying opposite one another but not provided with a reference numeral for the sake of a better overview of the drawing. The fastening of the lashing bracket 12 is performed with the two screw bolts 34, 35, which are screwed into the half-barrel nuts 30, 31. For this purpose, the half-barrel nuts 30, 31 have, with preference, continuous threaded holes. In the joined-together state, the channel 2 rests with its full surface area on an (upper) frame flange 36 of the frame 4. A possibly present lower frame flange is not represented in FIG. 1. The frame 4 and the channel 2 lying on top intersect underneath the lashing point 13 at an angle of approximately 90° and form a crossing region. The floor framework has a plurality of crossing regions arranged in the manner of a matrix.

On account of the fact that, by means of the two half-barrel nuts 30, 31, all the forces and moments induced in the lashing bracket 12 by a load are introduced directly in the region of a neutral fibre 37 of the frame 4, the latter can be of a lighter design, so that a weight reduction is possible.

Figure 2:
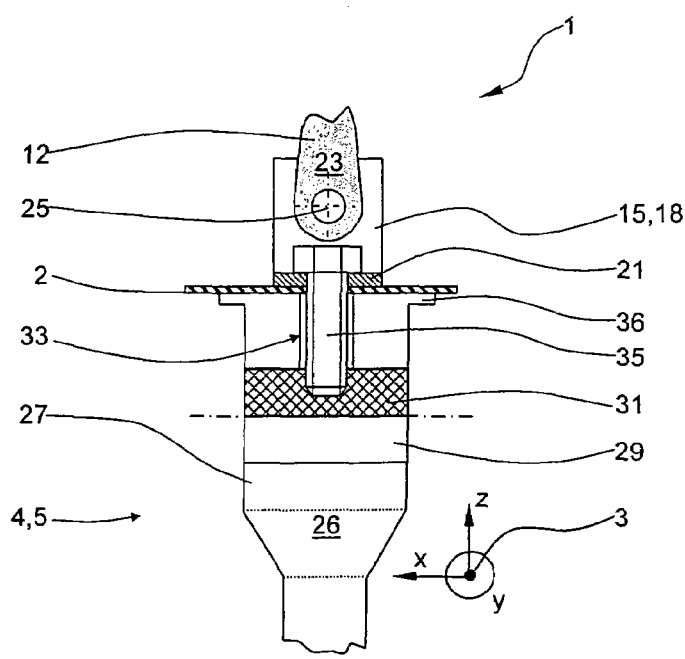
FIG. 2 shows a basic sectional representation along the sectional line II-II in FIG. 1.

FIG. 2 shows a schematized cross-sectional representation along the sectional line II-II of FIG. 1.

The frame 4 or the transverse beam 5 extends parallel to the y axis of the system of coordinates 3, while the channel resting on the frame flange 36 extends parallel to the x axis. The half-barrel nut 31 is accommodated in a transverse hole 29. The connection between the channel 2 and the frame 4 is performed by the screw bolt 35, which is screwed into the half-barrel nut 31 to brace the fastening arrangement 1.

The connection of the lashing bracket 12 to the channel 2 is performed by means of the fork holder 15, which is likewise fixed by the screw bolt 35 within the channel 2. With preference, the transverse hole 29 is made in a thickening 27 of the web 26 of the frame 4.

What is claimed is:

1. A fastening arrangement for lashing brackets in a floor of a cargo hold of an aircraft to create lashing points, wherein:
   at least one lashing bracket is pivotably accommodated in at least one channel that extends parallel to a longitudinal axis of the aircraft, the at least one channel is arranged on a plurality of transverse profiles that extend transversely in relation to the longitudinal axis, and
   the at least one channel and the at least one lashing bracket are fastened on at least one of the transverse profiles by at least two barrel nuts.

2. The fastening arrangement according to claim 1, wherein the at least one transverse profile is at least one of a transverse beam and a frame of a fuselage cell of the aircraft.

3. The fastening arrangement according to claim 1, wherein the at least one transverse profile has, at least in certain portions in a region of a web, a thickening in which at least two transverse holes are made to receive the barrel nuts.

4. The fastening arrangement according to claim 1, wherein the at least two barrel nuts are half-barrel nuts.

5. The fastening arrangement according to claim 1, wherein the channel has a U-shaped cross-sectional geometry with a base and two perpendicular side walls, each of the side walls having horizontally outward directed flanges.

6. The fastening arrangement according to claim 1, wherein two fork holders lying opposite one another bear against side walls of the at least one channel, each fork holder having a base plate with two legs arranged perpendicularly and spaced apart from one another, two opposite horizontal holes being respectively provided in each leg.

7. The fastening arrangement according to claim 1, wherein through two opposite horizontal holes of each one of two fork holders there is respectively guided a bolt, on which a lashing bracket leg is in each case pivotably accommodated.

8. The fastening arrangement according to claim 1, wherein base plates of fork holders each have a base plate hole and the at least one transverse profile has two vertical holes with an oversize to compensate for tolerance, in such a way that a screw bolt can in each case be guided through the base plate hole and a vertical hole to produce a screw connection with one of the barrel nuts.

9. The fastening arrangement according to claim 1, wherein the transverse profiles are uniformly spaced apart from one another.

* * * * *